April 21, 1953 J. L. RUSSELL 2,636,094
SYNCHRONOUS CONTACTOR
Filed July 9, 1949 2 SHEETS—SHEET 1

INVENTOR.
JOHN L. RUSSELL
BY E.C. Sanborn
ATTORNEY.

April 21, 1953          J. L. RUSSELL          2,636,094
SYNCHRONOUS CONTACTOR

Filed July 9, 1949          2 SHEETS—SHEET 2

INVENTOR.
JOHN L. RUSSELL

BY E. C. Sanborn

ATTORNEY.

Patented Apr. 21, 1953

2,636,094

UNITED STATES PATENT OFFICE 2,636,094

SYNCHRONOUS CONTACTOR

John L. Russell, Waterbury, Conn., assignor to The Bristol Company, Waterbury, Conn., a corporation of Connecticut Application July 9, 1949, Serial No. 103,869

11 Claims. (Cl. 200—93)

This invention relates to synchronous contactors, and more especially to a form of contactor adapted for use in conjunction with self-balancing electrical networks where small potentials resulting from unbalanced conditions are required to be converted to potentials of a different class and of proportional magnitude for detection and/or for the control of means for restoring the balance in such networks. While, in no sense restricted to such applications, this invention is particularly adaptable in conjunction with direct-current measuring networks for detecting small unidirectional potentials and producing therefrom alternating potentials of proportional magnitude and of phase position dependent upon the polarity of said unidirectional potentials. In the practice of electrical measurement, it is common to utilize such alternating potentials by suitable amplification, to operate an alternating current motor for rebalancing a network, or otherwise reducing to zero the unidirectional potential representing an unbalanced condition. In the copending application Serial No. 77,484 filed by F. L. Maltby and J. B. Kelley February 21, 1949, there is disclosed apparatus whereby the principle of synchronous inversion may be advantageously utilized in restoring the balance of such a network. Said application includes a vibrator structure having certain advantages with respect to isochronism of operation and general immunity to disturbing influences. Said application further discloses a manner in which two such devices, operating in conjunction, may be utilized in a manner to obtain materially increased efficiency in the utilization of the potential representing a condition of unbalance.

It is an object of the present invention to provide a commutating device having the desirable characteristics of symmetry, synchronism and isochronism, with a maximum simplicity of electrical circuits.

It is a further object to provide a commutator which shall be readily applicable to complete inversion of an unbalance current.

It is a further object to provide a device of the above nature whose operation shall be unaffected by position or by accelerations associated with rapid mechanical movements.

It is a further object to provide in a synchronous contactor a system of contacts whose performance shall tend to improve with continued use and whose engaging surfaces shall tend to be maintained in a clean and bright condition.

It is a further object to provide a synchronous contactor in which temperature differences of mutually adjacent parts of the electrical circuits, due to heat developed in the apparatus or to variations in ambient temperature, shall be minimized, thereby reducing the tendency toward development of parasitic thermoelectromotive force in measuring networks with which the apparatus may be associated.

It is a further object to provide a synchronous contactor in which, while the moving element is subjected to both unidirectional and alternating magnetic fluxes, the permanent magnet or other means by which the former flux is produced shall not be subjected to an alternating magnetomotive force.

It is a further object to provide a device of the above nature which shall be rugged and durable in construction, inexpensive to manufacture, and readily adapted to production on a quantity basis.

In carrying out the purpose of the invention, it is proposed to utilize the basic principle of synchronous contactors of the oscillating type to the extent that a deflectable armature positioned in a unidirectional magnetic field is exposed also to an alternating field, whereby to assume a vibratory motion utilizable in the operation of electrical contacts suitably included in a detector circuit. It is proposed to depart from the conventional principles of such contactors, in so proportioning the mechanical elements that there will be no tendency toward resonance at or near the operating frequency. It is further proposed to obtain a relatively long dwell of engaging contacts and a rapid transition from one contact position to another by so proportioning the electrical, mechanical and magnetic characteristics of the apparatus that a ferromagnetic armature comprised in the vibrating element becomes saturated at a relatively low value of the periodic magnetizing influence. Relative proportioning may be made such that a flux less than that corresponding to substantial saturation of the armature is sufficient to effect the mechanical displacement necessary for operation, and any excess magnetizing influence tends only to maintain the armature at one or other of its extreme positions until the alternating magnetic influence undergoes reversal.

Other features of the invention will be hereinafter described and claimed.

In the drawings:

Figs. 1, 2, and 3 are end, side, and top, elevations respectively of a contactor embodying the principle of the invention.

Figure 4:
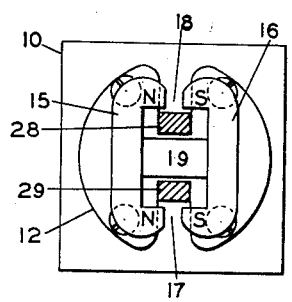
Fig. 4 is a top elevation taken in section on the line A—A in Fig. 1.
Figure 3:
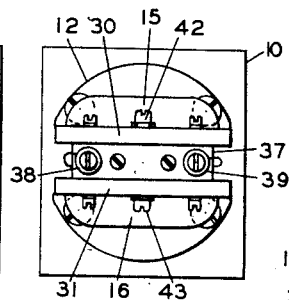

Referring now to the drawings:

Supported by a mounting base 10, as on posts 11, is a plate member 12 formed preferably of non-magnetic metal, such as brass, and adapted to have secured thereto the several operating elements presently to be described. The plate member 12, generally circular in form, is deeply notched at diametrically opposite locations to provide clearance for certain of the operating and structural parts. Secured to the upper surface of the plate member 12 are two C-shaped pole structures 15 and 16 formed of ferromagnetic material, preferably a low metalloid steel, characterized by low coercive force and relatively high permeability, and disposed with their concave faces facing inwardly, whereby their juxtaposed extremities will form air gaps 17 and 18 adapted to be traversed by magnetic flux. For reasons hereinafter to be set forth, it is desirable that the pole structures 15 and 16 be of laminated construction.

Figure 16:
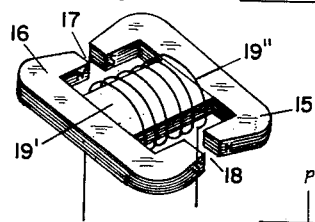
Fig. 16 is an isometric view of an alternative arrangement of certain elements shown in Fig. 7.

A permanent magnet 19, formed preferably of "Alnico" or equivalent magnetic material characterized by a high coercive force, and designed with a relatively low short linear dimension in comparison with its cross section area, is interposed between the concave surfaces of the structures 15 and 16 to provide a magnetic flux therethrough and to maintain in the airgaps 17 and 18 magnetic fields having relatively the same direction as seen in the drawing. It will be understood that, without departing from the spirit of the invention the permanent magnet 19 may be replaced by its full equivalent in the form of an electromagnet having a winding adapted for excitation from a suitable direct-current source, as diagrammatically illustrated in Fig. 16, wherein the permanent magnet 19 of Figs. 4 and 7 has been replaced by a "soft iron" member 19' of equivalent dimensions, preferably of laminated construction similar to the pole structures 15 and 16, and provided with a magnetizing coil 19''.

A U-shaped laminated ferromagnetic structure 20 carries on its yoke portion a coil or winding 21 adapted for excitation from a suitable alternating-current source. The structure 20 is supported from the plate member 12 by means of a thermally conducting bracket member 21' clamped to the structure 20 and secured to the plate 12 by screws or the like not shown in the drawings. Interleaved with the laminations of the U-shaped structure 20, but electrically insulated therefrom, as by plates 22 and 23 formed of mica or equivalent insulating material, are two deflectable members 24 and 25 formed of silicon steel sheet or equivalent ferromagnetic material. The members 24 and 25 are positioned to project in a common plane radially of the axis of the coil 21, whereby when the structure 20 carrying said members and the coil 21 is suitably juxtaposed to the permanent magnet 19 and the polar structures carried thereby, the members 24 and 25 will enter the air-gaps 17 and 18 and will be free for limited displacement therein toward and from the respective pole-tips. The members 24 and 25 are formed to be of small inertia and either relatively stiff in construction so that their natural frequency of vibration will be of a higher order than that of the alternating voltage which it is proposed to impress upon the winding 21, or else of a non-resilient construction, whereby in either case said members will not be appreciably resonant to said voltage.

It has been found that optimum performance of coacting contacts is obtained when their surfaces are brought together without excessive impact. This condition requires low inertia and relatively high acceleration. It is thus desirable that the ratio of force of engagement to mass of the moving part be kept high. Experiments have shown that rapid initial acceleration, followed by contact engagement without undue impact may be obtained by so selecting the material and dimensions of the deflectable members 24 and 25 that they become magnetically saturated when subjected to a relatively low proportion of the maximum magnetizing influence which normal operating current in the winding 21 would tend to impress upon their structures. As previously noted, silicon steel sheet, such as is used in transformer cores, is advantageous. This material is not critical, however, and there may alternatively be utilized other ferromagnetic materials having characteristics similar to those of the silicon steels commonly used in the cores of power transformers, and particularly the characteristic of a relatively high permeability and of saturation at a relatively low value of the maximum magnetizing influence. For instance, common open hearth steel (which was used in early power transformers) may be employed. Other materials which may be used are nickel-iron alloys in the group known by the trade-names "Permalloy" and "Mumetal," characterized by their being saturable at relatively low values of the maximum magnetizing force. These latter materials, however, being saturable at lower flux densities than the silicon steels, are not especially advantageous.

If desired, the condition of saturation may be developed in a portion of the magnetic circuit other than the members 24 and 25, such as a portion of the core 20. To that end the core, or desired portion thereof, may be composed of silicon steel or other suitable ferromagnetic material previously referred to as saturable at a relatively low proportion of the maximum value of the magnetizing force, while the members 24 and 25 may be of any desired material suitable for the passage of flux of the desired strength. For optimum performance, however, it is preferred that the portion of the magnetic circuit which becomes saturated at a relatively low proportion of the maximum magnetizing influence should consist of the members 24 and 25, rather than the core 20.

Figure 13:
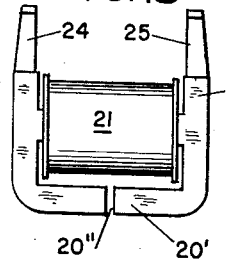
Fig. 13 shows an alternative form of the alternating electromagnetic structure.

Alternatively, the magnetic circuit of the coil 21 may take the form shown in Fig. 13, which differs from that hereinbefore set forth to the extent of the core being provided with a magnetic shunt 20' preferably including an air-gap 20''. By suitably proportioning the shunt and the air gap with respect to other elements of the magnetic system, the inductive reactance of the winding 21 may be maintained more constant than would otherwise be possible, thus materially reducing power consumption in the exciting winding, and also substantially eliminating current wave distortion due to cyclic saturation of the magnetic circuit.

Mounted at the extremities of the members 24 and 25 are double faced electrical contact pieces 26 and 27 respectively adapted upon deflection of either member from its normal intermediate position to engage, and provide electrical connection with, stationary contact members presently to be described.

Secured to the plate 12 are vertically extending massive metallic posts 28 and 29; and laterally mounted thereon and electrically insulated therefrom, as by thin mica plates, not shown in the drawing, whereby to provide electrical insulation with a minimum interference with thermal conductivity, are extended metallic bars 30 and 31, so disposed that when assembled their end portions will project beyond the contacts 26 and 27 carried by the members 24 and 25. The bar 30 carries near its extremities two adjustable contacts 32 and 33, the former adapted to engage one face of the movable contact 26 and the latter one face of the movable contact 27. Similarly mounted on the bar 31 are adjustable contacts 34 and 35 adapted to engage the other faces of said movable contacts respectively. Thus, the contact 26, if caused to oscillate with motion of the member 24 in the air gap 17 toward and from the juxtaposed magnetic pole pieces will tend to engage alternately the contacts 32 and 34 thus functioning as a single pole double throw switch. Similarly, with oscillation of the member 25 in the air gap 18 the contact 27 will tend to engage alternately the contacts 33 and 35, thus also functioning as a single-pole double-throw switch. Mounted upon the posts 28 and 29 is a terminal plate 37, carrying insulated terminals 38 and 39, which, by means of short flexible leads 40 and 41, are connected respectively to the movable contacts 26 and 27. Binding screws or terminals 42 and 43, directly mounted on the bars 30 and 31, respectively, provide for connection of said bars, and therefore of the contacts carried thereby, to an external circuit.

With the structure as described assembled with its parts in their normal cooperating relationship, it will be seen that the polarities of the members 24 and 25, as they become magnetized due to current in the winding 21, will be so related to the flux set up by the magnet 19 in the air gaps 17 and 18 that said members functioning as armatures in the magnetic system, will tend to be deflected in opposite directions. Thus, if the member 24 is deflected in a direction to bring the contact 26 into engagement with the contact 34, the member 25 will be deflected in such a direction as to bring the contact 27 into engagement with the contact 33. Similarly, upon a reversal of current in the winding 21, the contacts 26 and 27 will be brought into electrical engagement with the stationary contacts 32 and 35 respectively. Thus, considering the terminals 38 and 39 as one pair, and the terminals 42 and 43 as another pair, the performance of the interposed contacting system will be that of a reversing switch or commutator operating syncronously with an alternating current flowing in the winding 21. It will further be apparent that a similar, though not identical, performance may be obtained by exciting the field structure from an alternating source, as by passing alternating current through the winding 19'' shown in Fig. 16, and at the same time passing direct current through the winding 21.

Attention may be called to an advantageous feature of the magnetic system as set forth, wherein the permanent magnet 19 is provided with the C-shaped pole structures 15 and 16 disposed with respect to the alternating magnetic circuit in the manner shown. The pole structures 15 and 16 provide return paths for the alternating flux which passes through the armatures 24 and 25; and hence those parts of the magnetic circuits are required to carry both alternating and unidirectional magnetic flux. In other words the normal flux from the magnet 19 traversing the pole structures 15 and 16 has superimposed upon it alternating component of considerable magnitude. While the pole structures 15 and 16, especially if of laminated construction, are not adversely affected by this combination of flux components, it is highly desirable that the permanent magnet 19 not be subjected to such variations in flux density. With the structure shown, there will not at any time appear between the extremities of the magnet 19 an alternating magnetomotive force; consequently, the ends of this magnet remaining always free of alternating magnetic potential difference, there will be no tendency for alternating flux to pass through the mass of the magnet. The importance of protecting permanent magnets from alternating fields is well-known in the art of electrical measurement and is especially applicable to materials of high coercive force such as it is expedient to use in the present structure.

Figure 7:
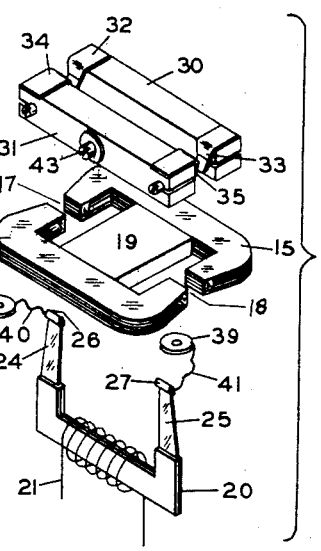
Fig. 7 is an isometric exploded view of certain coacting elements of the apparatus shown in the previous drawings.
Figure 1:
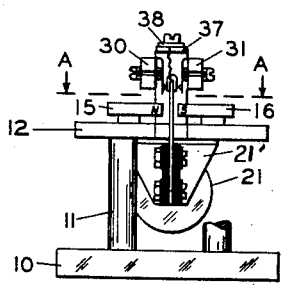
Figure 2:
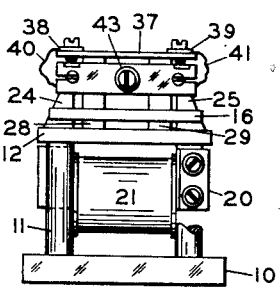
Figures 5, 6:
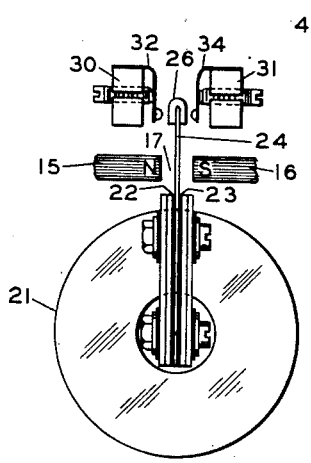
Figs 5 and 6 are end, and side, elevations respectively of certain details of the device shown to an enlarged scale.
Figures 8, 9:
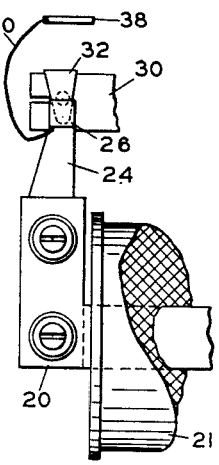
Figs. 8 and 9 are a side, and end, elevation, respectively, to a further enlarged scale, of certain details of a preferred form of the invention.
Figure 12:
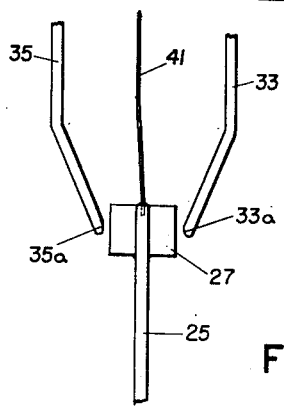
Fig. 12 is a representation, to a scale still further enlarged than that of Figs. 8 and 9 of certain details of said preferred form of the invention.

In Figs. 8, 9 and 12 is shown a preferred form of contact assembly especially adapted to the purposes of the invention. The details are illustrated particularly in relation to the contact 35 and its mounting upon the bar 31, and it will be understood that the other contacts carried by the bars 30 and 31 are mounted and assembled in identical manner. The contact member 35 takes the form of a thin strip of resilient contact material, as, for example, of one of the well known alloys of noble metals having suitable contact characteristics coupled with a high degree of resiliency. The upper part of the strip is horizontally disposed and positioned in a shallow slot near the extremity of the bar 31 where it is secured as by soldering. The strip is curved downward from its upper flat portion, its middle portion being vertically disposed and spaced a short distance from the inner edge of the bar 31. The lower portion of the strip 35 is bent slightly away from the bar 31 toward the median line of the assembly, and is tapered, as shown in Fig. 8, whereby to reduce the inertia, and also the stiffness, of the downwardly projecting portion of the strip 35. The edge of the lower extremity of the inwardly bent portion of the strip 35 is rounded to a very small radius, as shown at 35a in Fig. 12, whereby to have a generally cylindrical or wire-like conformation. The ferromagnetic armature 25, positioned between the magnet poles 15 and 16, is provided with a double-faced contact portion 27 which may be formed of two small plates of suitable contact metal soldered, or otherwise secured, to opposite sides of the extremity of said armature. The flexible lead 41, whereby connection is provided from member 25 to the terminal 39, shown in Fig. 7, may expediently be secured to the extremity of the member 25 by the same soldering attachment of the double-faced contact 27. An adjusting screw 45, threaded through the bar 31, is provided with a hemispherical point, and bears upon the intermediate portion of the contact strip 35 whereby to provide a convenient adjustment of the position of said strip toward or from the contact 27. In order to obtain a clamping action whereby to prevent undesirable loosening of the screw 45, the bar 31 may be provided with a slot 44 extending from the extremity of the bar to the tapped opening into which said screw is threaded. It will be seen that engagement between the rounded edge of the tip of the strip 35 and the flat face of the plate 27 will tend to provide a line contact of appreciable horizontal extent. It will further be apparent that the contact strip 35, as displaced by pressure of the plate 27, will move about a virtual center definitely removed from that about which the contact 27 moves with displacement of the armature 25, whereby there will be established a rubbing action between the engaging contact surfaces, with a consequent tendency to improve the contacting performance, and also to remove any dirt or scale which might otherwise tend to form on the contact surfaces. The contact strip 33, which is carried by the bar 30, as shown in Fig. 7, is also indicated in Figs. 9 and 12, and its rounded edge indicated at 33a. It will be seen that the contact 27 with its oscillatory motion will engage alternately the strips 35 and 33, and that the duration of such engagements in each cycle of operation will be subject to the adjusted settings of the screw 45 and the corresponding screw in the bar 30.

In the selection and proportioning of parts as thus far set forth, provision is made for the avoidance of such temperature gradients between coacting contacts and in juxtaposed electric circuits as would favor the development of objectionable thermoelectromotive forces in the measuring network. It will be observed that the plate 12 forms a massive thermally conducting mounting tending to equalize temperatures due to heat transmitted through the core and the mounting brackets from the coil 21. While a certain amount of heat will flow through the armatures 24 and 25 to the contacts carried thereby, the plate 12 with its associated parts forms a thermal shunt tending to equalize temperatures between the stationary and the moving contacts. The massive posts 28 and 29 secured to the plate 12, and having a minimum of insulation from the blocks 30 and 31, tend to permit heat to flow to these blocks; and, by proper proportioning of the related parts, the stationary contacts may thus be maintained at a temperature substantially equal to that attained by the movable contacts due to the direct transmission of heat from the core 20.

Figure 10:
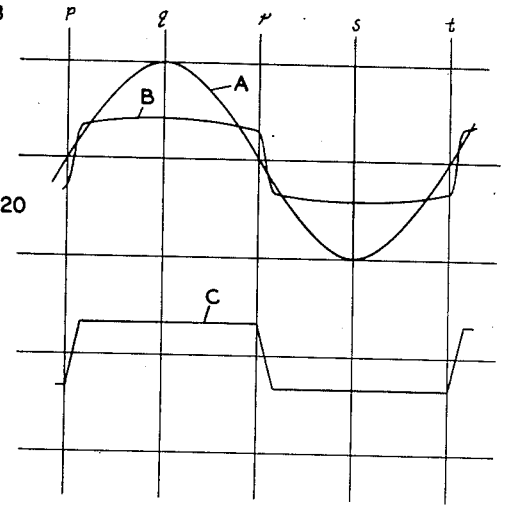
Fig. 10 is a graphic representation of certain cyclic phenomena attending the operation of the device covered by the invention.

The timing characteristics of the apparatus as set forth will be understood by reference to Fig. 10, wherein all magnitudes are graphically represented to a common set of time ordinates $p$, $q$, $r$, $s$, $t$, each corresponding to a quarter-cycle of the basic frequency. The curve A in the upper portion of the diagram represents the current flowing in the winding 21, and therefore the magnetizing force applied to the magnetic circuit associated therein, and including the laminated ferromagnetic structure 20 and the armature members 24 and 25. Because of said members being of a material and design selected to become saturated at a relatively low flux value, the curve B may be taken as representing the total flux in either armature effective to react with the permanent magnet field in the corresponding one of the air gaps 18 and 19. Thus, beginning with the ordinate $p$, representing the instant when the alternating current in the winding 21 is passing through its zero value as it changes from negative to positive in its direction of flow, the flux B may be indicated as initially following a similar rate of increase. However, very early in the cycle (for example, at a value of the order of 3% of the maximum magnetizing current) the flux in either armature attains substantially its maximum strength, and thereafter increases a relatively small amount as the current continues to increase, attains its peak near $q$, and declines to a zero value. As the zero current value is approached toward the termination of the pulse, the flux in the armature is weakened, falls below the saturation value, and, very shortly after the current passes through its zero value at $r$ (the interval depending upon hysteresis characteristics of the armature material), reverses its polarity, and builds up to saturation in a reverse sense.

Since the deflecting force exerted upon the armature will be substantially proportional to the strength of the flux therein from the winding 21, it will be seen that the tendency of either armature is to be quickly deflected with a rapidly increasing force as the current passes through its zero value, and to remain in its deflected position with relatively little increase in that force until current reversal takes place at the end of the succeeding half-cycle. Since engagement of the movable contact with the stationary contact limits further deflection of the former, the cyclical motion of either of the movable contacts will be as indicated by the curve C in the lower part of the diagram, the contacts being brought into definite engagement and there maintained with little increase in force, until with the magnetizing current again passing through its zero value the magnetizing force becomes such as to reverse the polarity of the armature and quickly remagnetize it to saturation and in a sense opposite to its previous polarity. By so proportioning and adjusting the component elements of the device that the contacts are brought into positive engagement when the flux is slightly below the saturation value it is possible to eliminate not only bouncing and chattering of the contacts in operation but also the undesirable feature of excess contact pressure while in engagement.

Figure 11:
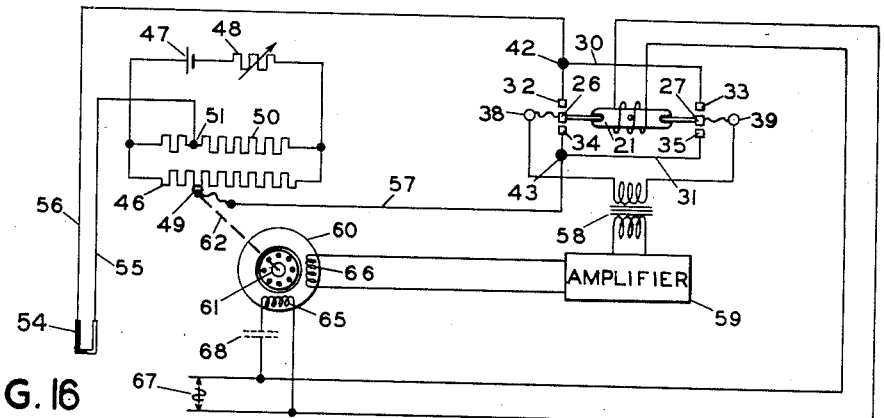
Fig. 11 is a diagram of a circuit and apparatus to which the present invention is especially adapted.

In Fig. 11 is shown a self-balancing system having a servomotor to whose operation the present invention is especially adapted. A slide wire 46 adapted for energization from a constant potential battery or equivalent source 47 in series with an adjustable current-standardizing resistor 48, is provided with a movable contact 49 adapted to cooperate with said slide wire in selecting therealong a point of potential suitable to balancing the associated network. In parallel with the slide wire 46 is a resistor 50 having a tapped point 51 providing one terminal to which is made connection from a source of electromotive force whose magnitude is to be measured. Said source of electromotive force may be represented by a thermocouple 54 having extension leads 55 and 46, of which the former is connected to the terminal point 51, and the latter to the contact 42 in series with a synchronous inverter which may be identical to that hereinbefore set forth, and which is so shown.

The extension lead 56 is connected to the terminal 42 of the synchronous inverter and thence through the bar 30 to the contacts 32 and 33. The contact 49 associated with the slide wire 46 is connected by means of a conductor 57 to the terminal 43 of the inverter, and thence through the bar 31 to the contacts 34 and 35. The terminals 38 and 39 of the inverter, leading from the movable contacts 26 and 27 respectively, are connected to the primary terminals of a suitable isolating transformer 58, whose secondary is connected to the input terminals of an amplifier 59.

An induction motor 60 is provided with a rotor 61 having mechanical connecting means 62 to the movable contact 49, whereby to position the latter with respect to the slide wire 46. Said motor is provided with two mutually displaced stator windings 65 and 66, of which the former is adapted for energization from a constant frequency alternating current source 67, and the latter is connected to the output terminals of the amplifier 59. The winding 65 may have connected in circuit therewith a capacitor 68 or other phase-shifting device, whereby, according to principles well known in the art, to obtain optimum performance of the motor. Alternatively the desired phase-shift characteristic may be introduced by suitable elements incorporated in the circuits of the amplifier 59. The winding 21 of the synchronous inverter is connected to the source 67, whereby operation of the contacting elements as hereinbefore set forth will be made synchronous with excitation of the winding 65 in the motor 60.

While no novelty is claimed for the measuring system to which it may be applied, the operation of the system shown in Fig. 11 will be briefly set forth. Under a condition of balance in the potentiometer network the unidirectional potential derived from said network will have a zero value, with the result that there will be no alternating voltage applied to the transformer 58 and thereby to the winding 66 in the motor 60. The motor will consequently not be subject to any driving influence and the contact 49 will remain in its position on the slide wire 46. Assuming a change of potential in the potentiometer network, as would result from a change in the temperature to which the thermocouple 54 is exposed, the network will no longer be balanced, and unidirectional potential will be applied to the detector network including the synchronous inverter. Thus, the contacts 32 and 33 will assume one polarity and the contacts 34 and 35 the opposite polarity. With the winding 21 energized from the source 67, the movable contacts 26 and 27 will coact with the associated stationary contacts, as hereinbefore set forth, to function as a reversing switch. There will thus appear between the terminals 38 and 39 a commutated potential, depending in intensity upon the magnitude of the voltage between the terminals 42 and 43, and in its phase position with respect to the energizing current in the winding 21 upon the polarity of said potential. The voltage between the terminals 38 and 39 being applied to the primary winding of the transformer 58, the secondary voltage of said transformer, after being suitably amplified in the amplifier 59, will be impressed upon the winding 66 of the motor 60. Said motor will thus be caused to operate, and will translate the contact 49 along the slide wire 46. By suitably selecting, proportioning and interrelating the elements of the system, the displacement of the contact 49 may be made to have a direction and magnitude such as to reduce to zero the total unidirectional potential output of the network, thus restoring the position of balance. The position of the contact 49 with respect to the slide wire 46 thus becomes a measure of the unidirectional potential derived from the thermocouple 14.

Figure 14:
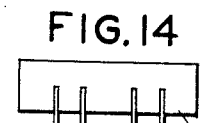
Figs. 14 and 15 illustrate electrical contact arrangements alternative to that shown in Figs. 9 and 12.

In Fig. 14 is shown a contact arrangement which may be substituted for that shown in Figs. 9 and 12 without departing from the spirit of the invention. In the interest of simplicity, obvious means for obtaining contact adjustment are not shown in the drawing, and the mounting of the contact members is represented in a purely schematic manner. The armature 25 is indicated in its mid-position in the air-gap 18 between the polar structures 15 and 16; but, instead of having an electrical contact surface, said armature is provided with a button or pad 70 of insulating material, whereby contacting elements may be actuated without the armature becoming a part of the electrical circuit. The contact assembly is indicated as comprising a mounting block 71 insulatedly carrying two sets of contact springs, an inner set 72 and 73 resiliently engaging the button 70 and adapted for deflection thereby with lateral displacement of the armature 25, and an outer set 74 and 75 juxtaposed to the outer surfaces of the springs 72 and 73 respectively, normally out of contact therewith, but adapted to be engaged thereby as said inner springs are deflected. There is thus obtained a contacting action similar to that obtained with the assembly shown in Figs. 9 and 12; but as the armature 25 forms no part of the electrical circuit the latter is not subject to spurious electromotive forces induced by varying linkage with magnetic lines of force.

Figure 15:
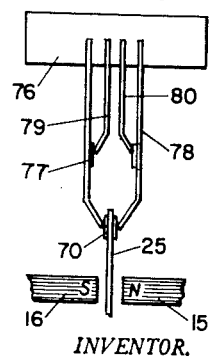

The contact assembly shown in Fig. 15 is essentially similar to that indicated in Fig. 14, differing therefrom mainly in its adaptability to circuits wherein it is required that the contacts be normally closed, and subject to opening only as that armature is displaced from its neutral position. The arrangement of the armature 25, carrying an insulating button 70 is identical with that shown in Fig. 14. A mounting block 76 carries an outer pair of contact springs 77 and 78 resiliently engaging the button 70, and between them an inner set of springs 79 and 80 normally in contact with the springs 77 and 78 respectively, and adapted to be disengaged therefrom as the latter are deflected by displacement of the armature 25 from its neutral position. Thus, both cooperating pairs of contacts normally and simultaneously close the circuits in which they are included, opening said circuits only as the armature 25 makes its excursions to the left or the right of its neutral position. In each of the embodiments shown in Figs. 14 and 15, all contacts are indicated as mutually insulated. It will be obvious that this arrangement provides maximum flexibility of electrical connection, and that in associating the contact members with electrical circuits to be controlled thereby said contacts may be interconnected to any desired degree and in any desired combination.

The terms and expressions which I have employed are used as terms of description and not of limitation, and I have no intention, in the use of such terms and expressions, of excluding any equivalents of the features shown and described or portions thereof, but recognize that various

I claim:

1. In a synchronous contactor, the combination of means for producing a substantially constant unidirectional magnetic field, said means comprising a pair of C-shaped polar structures, said polar structures being mounted with their extremities mutually juxtaposed to form two air gaps magnetically in parallel, a stationary U-shaped magnetizable structure, means rigidly supporting said U-shaped structure, a pair of deflectable members carried by said U-shaped structure at the ends thereof and electrically insulated therefrom, said members being positioned respectively in said air gaps for limited displacement therein in the direction of the magnetic flux in said gaps, means for impressing an alternating magnetomotive force upon said members to cause them to oscillate in said air gaps, the material and dimensions of said members being such that the members become substantially saturated magnetically when the magnetomotive force has attained a relatively small proportion of its maximum value, movable contacts carried by said members, and stationary contacts adapted to be engaged by said movable contacts.

2. In a synchronous contactor, the combination of means for producing a substantially constant unidirectional magnetic field, said means comprising a pair of C-shaped polar structures, said polar structures being mounted with their extremities mutually juxtaposed to form two air gaps magnetically in parallel, a U-shaped magnetizable structure, a pair of deflectable members carried by said U-shaped structure at the ends thereof and electrically insulated therefrom, said members being positioned respectively in said air gaps for limited displacement therein in the direction of the flux from said magnet in said gaps, the ends of said U-shaped structure supporting said members being rigid with each other, means for impressing an alternating magnetomotive force upon said members to cause them to oscillate in said air gaps, the material and dimensions of said members being such that they become substantially saturated magnetically when the magnetomotive force has attained a relatively small proportion of its maximum value, movable contacts carried by said members, stationary contacts adapted to be engaged by said movable contacts thereby to limit their deflection, and electrical connections whereby said contacts may synchronously coact to perform a switching function.

3. In a synchronous contactor, a contact adapted for oscillatory displacement through a limited range, a pair of stationary contacts adapted to be alternately engaged by the first-mentioned contact with displacement thereof to its respective extreme positions, and means for snapping said oscillatory contact alternately into engagement with said stationary contacts at regularly recurring instants of time and maintaining contact engagement throughout substantially the entire intervals between said instants, said means comprising a member carrying the first-mentioned contact and substantially saturable magnetically as an alternating magnetomotive force applied thereto attains a value slightly beyond zero in either direction and said first-mentioned means also comprising an electrically conductive winding for applying said magnetomotive force to said member.

4. In a synchronous contactor, a contact adapted for oscillatory displacement through a limited range, a pair of stationary contacts adapted to be alternately engaged by the first-mentioned contact with displacement thereof to its respective extreme positions, and means for snapping said oscillatory contact alternately into engagement with said stationary contacts at regularly recurring instants of time and maintaining contact engagement throughout the major portions of the intervals between said instants, said means comprising a member carrying the first-mentioned contact and substantially saturable with magnetic flux for shifting said member to one or the other of its extreme positions at a relatively low value of an alternating magnetomotive force applied thereto, said first-mentioned means also comprising an electrically conductive winding for applying said magnetomotive force to said member.

5. In combination, a pair of conductors, a first pair of contacts, one of which is connected to one of said conductors and the other to the other of said conductors, a second pair of contacts, one of which is connected to the first of said conductors and the other to the other of said conductors, a first oscillator element carrying a contact movable alternately into engagement with the contacts of said first pair, a second oscillator element displaceable independently of said first oscillator element and carrying a contact movable alternately into engagement with the contacts of said second pair, electromagnetic means common to said oscillator elements and adapted to energization from an external alternating-current source of substantially constant frequency for subjecting each of said elements to an alternating magnetizing force to oscillate said elements in synchronism at said frequency to engage the first mentioned movable contact with the first mentioned contact of said first pair concurrently with engagement of the second mentioned movable contact with the second mentioned contact of said second pair and to engage said first mentioned movable contact with the second contact of said first pair concurrently with engagement of said second mentioned movable contact with the first mentioned contact of said second pair.

6. In a synchronous contactor, the combination of means for producing a substantially constant unidirectional magnetic field, said means comprising a pair of C-shaped polar structures, said polar structures being mounted with their extremities mutually juxtaposed to form two air gaps magnetically in parallel, a U-shaped magnetizable structure comprising at its extremities a pair of deflectable armatures electrically insulated from the body of said structure, said armatures being positioned respectively in said air gaps for limited displacement therein in the direction of the flux from the magnet in said gaps, means for impressing an alternating magnetomotive force upon said armatures to cause them to oscillate in said air gaps, contacts carried by said armatures, a pair of metallic bars, one on each side of said air gaps, a pair of stationary contacts carried by the respective bars for engagement by the contact on one of said armatures, and a pair of stationary contacts carried by the respective bars for engagement by the contact of the other of said armatures, each of said stationary contacts being conductively connected to the bar by which it is carried.

7. In a synchronous contactor, the combination of means for producing a substantially constant unidirectional magnetic field, said means comprising a structure having two air gaps magnetically in parallel, means including a magnetic system a part of which is stationary and having at its ends a pair of deflectable members electrically insulated from said stationary part, said members being positioned respectively in said air gaps for limited displacement therein in the direction of the magnetc flux in said gaps, means rigidly supporting said stationary part, means for impressing an alternating magnetomotive force upon said members to cause them to oscillate in said gaps, the material and dimensions of said magnetic system being such that a portion thereof becomes magnetically saturated when said magnetomotive force has attained a relatively small proportion of its maximum value, movable contacts carried by said members, and stationary contacts adapted to be engaged by said movable contacts.

8. In a device of the class described, electric contact means, other electric contact means movable into and out of engagement with the first-mentioned contact means, electromagnetic means for actuating said other contact means, and means for substantially equalizing the temperatures of both said contact means to minimize thermoelectric forces therebetween, said equalizing means comprising a plate of thermally conductive material through which both said contact means are supported.

9. In a device of the class described, a plate of non-magnetic thermally-conductive material, posts of thermally-conductive material extending from said plate, bars of thermally-conductive material mounted on said posts, electric contacts carried by said bars, other electric contacts thermally associated with said plate and movable into and out of engagement with the first mentioned contacts, electromagnetic means for operating said other contacts, said electromagnetic means comprising a core thermally associated with said plate.

10. In a device of the class described, a plate of non-magnetic thermally-conductive material, a pair of extended ferromagnetic polar structures mounted on said plate, said polar structures having mutually juxtaposed pole tips separated by gaps, said plate having notches below said gaps, a permanent magnet extending between mid-portions of said polar structures, electric contact means mounted on said plate and in thermal association therewith, other electric contact means movable into and out of engagement with the first mentioned contact means, members extending through said notches and said air gaps and carrying said other contact means, electromagnetic means for passing an alternating magnetic flux through said members in said air gaps for operating said other contact means, and means thermally connecting said other contact means and said electromagnetic means with said plate.

11. In a device of the class described, a plate of non-magnetic thermally-conductive material, a pair of extended ferromagnetic polar structures mounted on said plate, said polar structures having mutually juxtaposed pole tips separated by gaps, said plate having notches below said gaps, magnetic means extending between mid-portions of said polar structures, electric contact means mounted on said plate and in thermal association therewith, other electric contact means movable into and out of engagement with the first mentioned contact means, members extending through said notches and said air gaps and carrying said other contact means, other magnetic means for passing magnetic flux through said members in said air gaps for operating said other contact means, and means thermally connecting said other contact means and said electromagnetic means with said plate.

JOHN L. RUSSELL.

References Cited in the file of this patent

UNITED STATES PATENTS

| Number | Name | Date |
|---|---|---|
| 691,667 | Rowland | Jan. 21, 1902 |
| 1,102,507 | Hildebrand | July 7, 1914 |
| 1,149,054 | Hoppe et al. | Aug. 3, 1915 |
| 1,466,260 | Wensley | Aug. 28, 1923 |
| 1,541,618 | Brown | June 9, 1925 |
| 1,691,203 | Lee et al. | Nov. 13, 1928 |
| 1,716,777 | Hopkins | June 11, 1929 |
| 2,203,727 | Herbst | June 11, 1940 |
| 2,423,524 | Side | July 8, 1947 |

FOREIGN PATENTS

| Number | Country | Date |
|---|---|---|
| 502,769 | Germany | July 23, 1930 |
| 887,951 | France | Aug. 23, 1943 |